United States Patent
Sutoh et al.

[11] Patent Number: 5,937,771
[45] Date of Patent: Aug. 17, 1999

[54] METHOD OF PROCESSING KILN EXHAUST GASES BY CHLORINE BYPASS SYSTEM AND APPARATUS THEREFOR

[75] Inventors: Kanzaburo Sutoh, Tsukumi; Mitsuaki Murata, Tokyo; Naoki Ueno, Kumagaya, all of Japan

[73] Assignee: Taiheiyo Cement Corporation, Japan

[21] Appl. No.: 08/875,516

[22] PCT Filed: Dec. 4, 1996

[86] PCT No.: PCT/JP96/03545

§ 371 Date: Jul. 28, 1997

§ 102(e) Date: Jul. 28, 1997

[87] PCT Pub. No.: WO97/21638

PCT Pub. Date: Jun. 19, 1997

[30] Foreign Application Priority Data

Dec. 11, 1995 [JP] Japan ................................ 7-321993

[51] Int. Cl.⁶ .................................................. F23J 11/00
[52] U.S. Cl. .......................... 110/345; 110/246; 110/216; 432/111; 432/117; 106/745
[58] Field of Search ..................... 110/345, 246, 110/226, 203, 216; 432/117, 111, 113, 106; 106/693, 739, 745, 751

[56] References Cited

U.S. PATENT DOCUMENTS

| | | |
|---|---|---|
| 3,653,645 | 4/1972 | Heian . |
| 3,923,536 | 12/1975 | Kobayashi . |
| 4,440,578 | 4/1984 | Wadia . |
| 4,465,520 | 8/1984 | Jehmlich et al. . |
| 4,541,245 | 9/1985 | Becker et al. . |
| 4,556,428 | 12/1985 | Wolter et al. . |
| 4,576,644 | 3/1986 | Goldmann . |
| 5,244,383 | 9/1993 | Kreft et al. ........................ 432/106 X |
| 5,259,876 | 11/1993 | Enkegaard . |
| 5,704,780 | 1/1998 | Bauer ...................................... 432/106 |

FOREIGN PATENT DOCUMENTS

| | | |
|---|---|---|
| 2116649 | 5/1990 | Japan . |
| H796464 | 10/1995 | Japan . |

OTHER PUBLICATIONS

Duda, Walter H. Dipl.–Ing, *Cement–Data–Book in* International Process Engineering in the Cement Industry vol. 1, pp. 455–461 Bauverlag GmbH, Berlin (3d ed. 1985).

*Primary Examiner*—Henry A. Bennett
*Assistant Examiner*—Susanne C. Tinker
*Attorney, Agent, or Firm*—Price, Heneveld, Cooper, DeWitt & Litton

[57] ABSTRACT

In the processing of exhaust gases by a chlorine bypass system, a portion of kiln exhaust gases G is extracted from a kiln 1, after the extracted exhaust gases G are instantly cooled to 600° C. to 700° C. or less, the dust W in the cooled exhaust gases is separated to rough powder and fine powder by a separator, the separated rough powder is returned to the kiln 1 and the separated fine powder is discharged to a cement system, wherein extracting means extracts the kiln exhaust gases at the ratio more than 0% to equal to or less than 5% and the separating point of the separator is set to 5 μm to 7 μm.

9 Claims, 7 Drawing Sheets

METHOD OF PROCESSING KILN EXHAUST GASES BY CHLORINE BYPASS SYSTEM AND APPARATUS THEREFOR

TECHNICAL FIELD

The present invention relates to a method of processing gases exhausted from a kiln by a chlorine bypass system and an apparatus therefor.

BACKGROUND ART

In general, when cement clinker is calcined by a SP (suspension preheater) kiln or a NSP (new suspension preheater) kiln, volatile components such as chlorine, alkali, sulfur etc. brought from cement raw material and fuel are sequentially concentrated by circulating in the kiln preheater.

However, it is known that the circulation reaches equilibrium in a few hours so that the amount of the volatile components brought into a system from the cement raw material and fuel becomes equal to the amount of the volatile components taken out to the outside of the system by the cement clinker.

When a large amount of the volatile components is brought by the raw material and fuel in this case, the amount of the volatile components in the clinker is increased, by which the quality of cement is adversely affected.

Further, when the amount of the volatile components is increased in the system, since compounds of low melting point are made, the preheater is often clogged, by which the stable operation of the kiln is obstructed.

Recently, when the effective utilization of industrial waste is promoted in particular, a raw material containing a large amount of chlorine cannot help being used, thus it is desired to effectively remove the volatile components.

To cope with this problem, there is employed a so-called alkali bypass system to reduce the amount of the volatile components in the kiln preheater system. This is a method of extracting kiln exhaust gases containing highly concentrated volatile components to the outside of the system by an alkali bypass system. Next, the alkali bypass system will be briefly described.

Kiln exhaust gases of about 1100° C. extracted from a kiln through an extraction duct are introduced into a cooling chamber and mixed therein with cooling air from a fan so as to reduce the temperature of the gases to 400 to 450° C. At the time, the compound of the volatile components is condensed on the surface of dust by the fall of the gas temperature.

Further, after the temperature of the gases is lowered to about 150° C. by spraying water to them in a conditioning tower, the dust in the gases is collected by an electrostatic precipitator and remaining gases are exhausted into the atmosphere through a fan.

Although the dust is collected by the conditioning tower and the electrostatic precipitator, since the dust contains the volatile components concentrated thereto, it is disposed of as waste.

However, in the above method, since the kiln exhaust gases of about 1100° C. are exhausted to the outside of the system, heat loss is greatly increased.

Further, because a large amount of the dust is discharged to the outside of the system and disposed of as waste, the disposal of it becomes difficult year by year due to the shortage of places where the dust can be disposed of and the change of the awareness of inhabitants who live in the vicinity of the places where the dust is disposed of.

In order to solve such problems, Japanese Patent No. 1835995 and Japanese Patent No. 1702995 disclose methods of reducing heat loss and the amount of dust to be disposed of.

These patents disclose a method of setting a gas cooling temperature to 600° C. to 700° C., collecting the dust in gases by a dust collector and returning exhaust gases to a preheater exhaust gas system to thereby collect the heat thereof by as waste heat boiler so as to reduce the heat loss of the exhaust gases, and a method of cooling extracted gases to 600° C. to 700° C., collecting the heat of the gases by a dedicated boiler, and then collecting the dust in the gases by a dust collector and exhausting the exhaust gases to the outside of a system. In addition, these patents realize reducing the absolute amount of the dust to be processed by causing the extracted gases whose temperature is made to 600° C. to 700° C. to pass through a separator so as to return the dust having a size of 10 μm or more to a kiln as it is.

In short, a gist of the above patents is to reduce heat loss and lower the cost of an apparatus by finding that the temperature of extracted gases can be increased from conventional 400° C. to 450° C. to 600° C. to 700° C.

Another gist of the patents is to reduce the amount of the dust to be disposed of by separating the dust whose size is greater than 10 μm by the separator and returning it to the kiln by finding that alkali is omnipresent to fine particle size.

That is, this invention is embodied by correctly grasping the condensing temperature of volatile components, discovering that a larger amount of alkali is distributed to the fine particle size of dust, and realizing the discovery.

The prior art intends to mainly remove alkali and a large amount of kiln exhaust gases must be extracted to achieve the object. Even if the two patents described above are embodied, the heat loss of a kiln/preheater system will be about 140 to 180 J/kg-clinker in a suspension preheater kiln and about 50 to 70 J/kg-clinker in a new suspension preheater kiln when 10% of kiln exhaust gases is extracted. The largest factor causing the heat loss is that the kiln exhaust gases are extracted in a large amount.

Further, since the amount of discharged dust is increased in proportion to the amount of the extracted gases, to employ a suitable method of processing the dust is also a large problem.

Taking the above circumstances into consideration, an object of the present invention is to economically and stably operate a kiln with a less amount of heat loss. Another object of the present invention is to simply dispose of fine particle dust.

DISCLOSURE OF THE INVENTION

A kiln exhaust gases processing method by a chlorine bypass system according to the present invention comprises the steps of extracting a portion of kiln exhaust gases from a kiln, cooling the extracted exhaust gases to a temperature equal to or lower than the melting temperature of a chlorine compound, separating the dust in the exhaust gases to rough powder and fine powder by a separator, and returning the separated rough powder to the kiln and supplying the fine powder to downstream of the separator, wherein the ratio of the extracted amount of the kiln exhaust gases is more than 0% to equal to or less than 5%.

A kiln exhaust gases processing method by a chlorine bypass system according to the present invention comprises the steps of extracting a portion of kiln exhaust gases from a kiln, cooling the extracted exhaust gases to a temperature equal to or lower than the temperature of a chlorine compound, separating the dust in the exhaust gases to rough powder and fine powder by a separator, and returning the separated rough powder to the kiln and supplying the fine powder to downstream of the separator, wherein the ratio of the extracted amount of the kiln exhaust gases is more than 0% to equal to or less than 5% and the particle size to be separated by the separator is 5 μm to 7 μm.

A kiln exhaust gases processing method by a chlorine bypass system according to the present invention comprises the steps of extracting a portion of kiln exhaust gases from a kiln, cooling the extracted exhaust gases to a temperature equal to or lower than the temperature of a chlorine compound, separating the dust in the exhaust gases to rough powder and fine powder by a separator, and returning the separated rough powder to the kiln and discharging the fine powder to the outside of the system, wherein the ratio of the extracted amount of the kiln exhaust gases is more than 0% to equal to or less than 5%, the particle size to be separated by the separator is 5 μm to 7 μm and all the fine powder which is exhausted to the outside of the system is mixed with clinker or cement.

A kiln exhaust gases processing apparatus by a chlorine bypass system according to the present invention comprises extracting means for extracting a portion of kiln exhaust gases from a kiln, cooling means for cooling the extracted exhaust gases to 600° C. to 700° C. or less, a separator for separating the dust in the cooled exhaust gases to rough powder and fine powder, and rough powder/fine powder transporting means for returning the separated rough powder to the kiln and supplying the separated fine powder to downstream of the separator, wherein the extracting means extracts the kiln exhaust gases at the ratio more than 0% to equal to or less than 5%, the separating point of the separator is 5 μm to 7 μm, and the rough powder/fine powder transporting means transports all the fine powder to a clinker tank or a finishing mill.

BEST MODE FOR CARRYING OUT THE INVENTION

The inventors eagerly studied the above problems of the prior art and examined first which of volatile components, which obstacle the stable operation of a kiln most obstacles it. As a result, the inventors found that chlorine most keenly affected the stable operation of the kiln. That is, the inventors found that although the content of chlorine was only about one tenth of alkali and sulfur in the components contained in clinker, the delicate change of concentration of the chlorine keenly affected the creation of a coating on a preheater and consequently the stable operation of the kiln.

Figure 1:
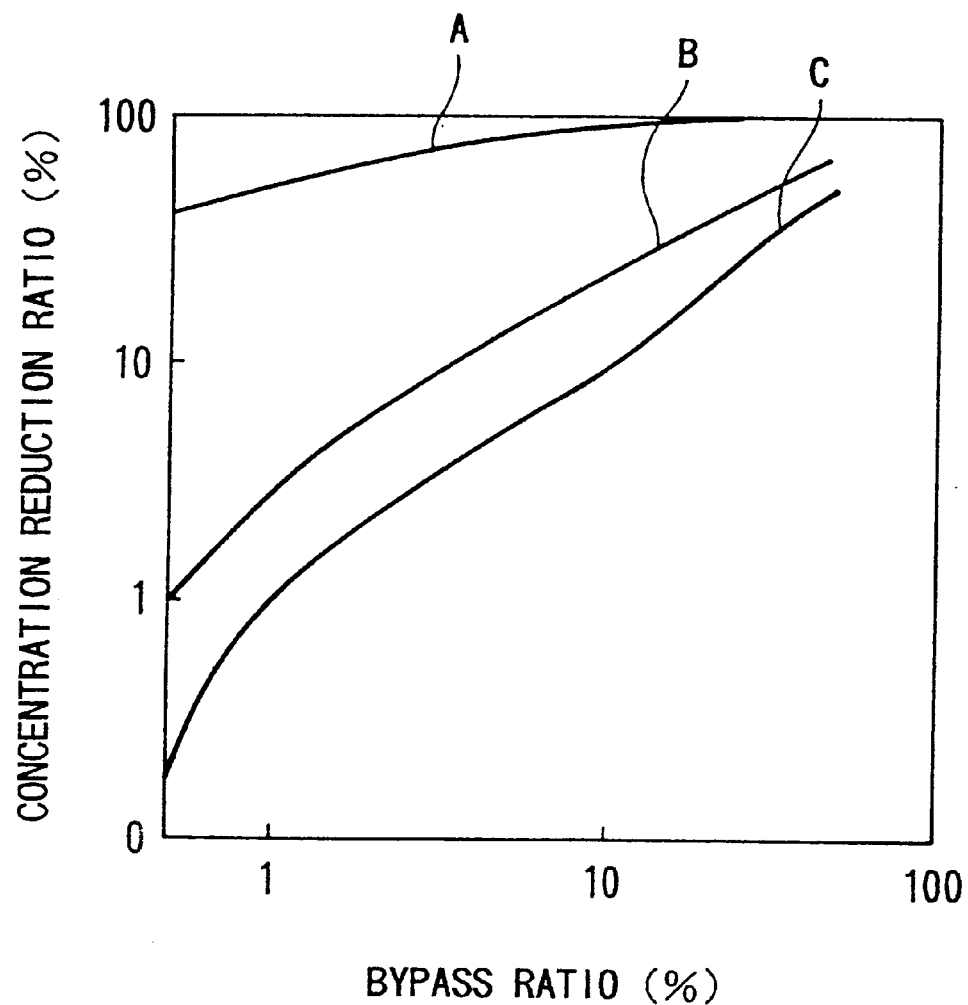
FIG. 1 is a graph showing the relationship between the bypass ratio of kiln exhaust gases (%) and a chlorine concentration reduction ratio (%) of the present invention.

The inventors examined a method of effectively removing chlorine based on the knowledge. As a result, it was found that a large reduction ratio of chlorine (curve A) could be obtained in a small amount of extraction as compared with alkali (curves B, C) as shown in FIG. 1. In FIG. 1, the axis of ordinates represents a concentration reduction ratio (%) and the axis of abscissas represents a bypass ratio (%), in which the values shown by them are represented by logarithm.

That is, it was found that 98% or more of chlorine could be removed by extracting 10% of kiln exhaust gases. In addition, it was found that since an alkali removing ratio was about 10% at the time, the extraction amount of the exhaust gases could be greatly reduced by making good use of the above-mentioned. In the experiment, the relationship between the extraction amount of kiln exhaust gases α% and the reduction ratio of chlorine β% (the reduction ratio of chlorine per 1% of a kiln extraction amount) was β=50% when 0%<α<1%, β=8.5% when 1%<α<5% and β=1.4% when 5%<α<14%. Therefore, the reduction ratio of chlorine reached 90% when the extraction amount of the kiln exhaust gases was about 5%, thus it was found that a sufficient effect could be achieved by the extraction amount of 5% as a result of the consideration of economical efficiency and practicality.

Figure 2:
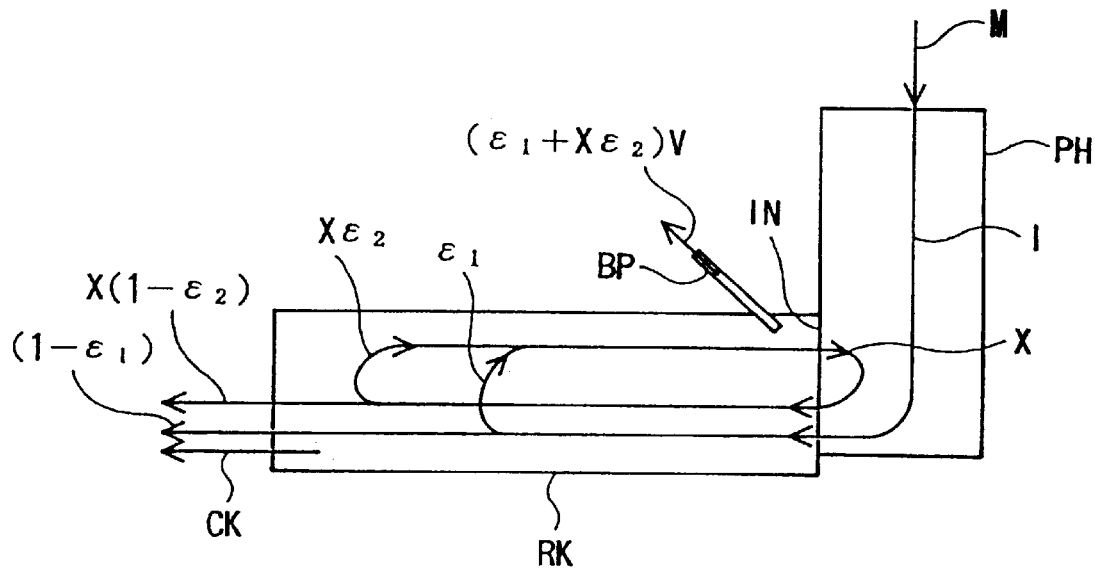
FIG. 2 is a graph showing an experimental apparatus.

Further, the inventors examined the bypass ratio (%) and the removal ratio (%) of chlorine and alkali by making a simple chlorine/alkali circulation model shown in FIG. 2.

In the model, a cement raw material M was charged into a kiln RK through a preheater PH and a portion of the chlorine and alkali (sodium and potassium) in the raw material M was volatilized and circulated in the kiln together with exhaust gases KG and the other of them was discharged to the outside of the kiln together with clinker CK.

When the volatility of chlorine and alkalies in the raw material M $\epsilon_1$ and the volatility of circulating chlorine and alkalies $\epsilon_2$ of the chlorine and alkali in the raw material M was examined by the experimental apparatus, that is, when the case that the chlorine and alkali were volatilized while circulated in a kiln and condensed and then volatilized again was examined, the result of the examination was chlorine $\epsilon_1=\epsilon_2=0.995$, sodium $\epsilon_1=0.2$, $\epsilon_2=0.8$, potassium $\epsilon_1=0.4$, $\epsilon_2=0.9$.

That is, the volatility factor $\epsilon_1$ of chlorine=99.5% was much larger than the volatiity factor $\epsilon_2$ of alkali (sodium 20%, potassium 40%). Therefore, the ratio of chlorine discharged to the outside of the kiln was 0.5% which was much smaller than that of alkali.

Since almost no chlorine was discharged to the outside of the kiln as described above, the concentration of the chlorine in the kiln was greatly thickened as compared with that of alkali, by which a coating was formed.

Figure 3:
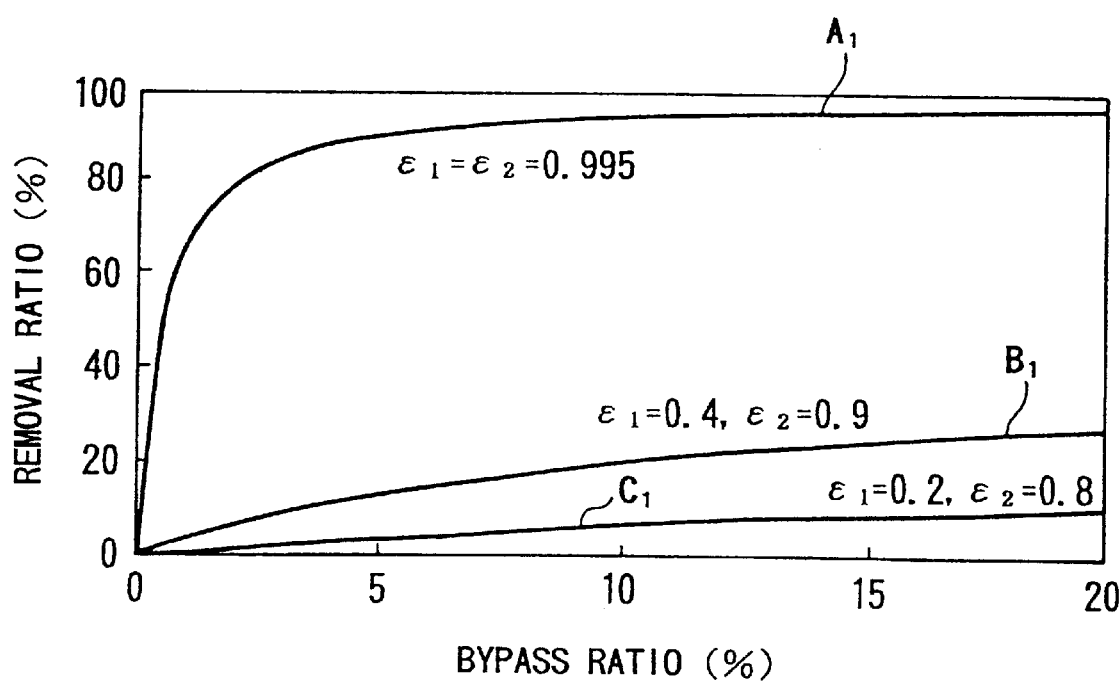
FIG. 3 is a view showing the result of an experiment.

Next, when kiln exhaust gases were extracted through a bypass BP formed to the vicinity of the inlet IN of the kiln and the extraction ratio (bypass ratio) (%) thereof and the removal ratio (%) thereof, which had the same meaning as the above concentration reduction ratio, were measured, the result shown in FIG. 3 was obtained.

In FIG. 3, a curve A1 represents chlorine, a curve B1 represents potassium and a curve C1 represents sodium, respectively. As apparent from FIG. 3, as to alkali (sodium C1, potassium B1), the bypass ratio was approximately in direct proportion to the removal ratio in the range of 0 to 10% of the bypass ratio. However, the removal ratio was as low as about 10% to 20% even if the bypass ratio was 10%. On the other hand, the high removal ratio of 60% or more could be obtained as to chlorine A1 even if the bypass ratio was as low as 2% or less, and the removal ratio of 90% could be obtained when the bypass ratio was 5%.

Note, there are known the following relations which represent the relationship between the removal ratio X of chlorine/alkali and the bypass ratio v thereof. $(\epsilon_1 + X\epsilon_2)(1-v)$=removal ratio X removal ratio $X = \epsilon_1(1-v)/\{1-\epsilon_2(1-v)\}$ removal ratio $X = 100(\epsilon_1 + X\epsilon_2)v$ From the relations, it can be found that when the volatility factors $\epsilon_1$, $\epsilon_2$ are higher, the bypass ratio v may be smaller to obtain a certain amount of the removal ratio X.

It is found from the above relations that it is preferable that the volatility factors $\epsilon_1$, $\epsilon_2$ are as high as possible to obtain the removal ratio x of constant.

Figure 4:
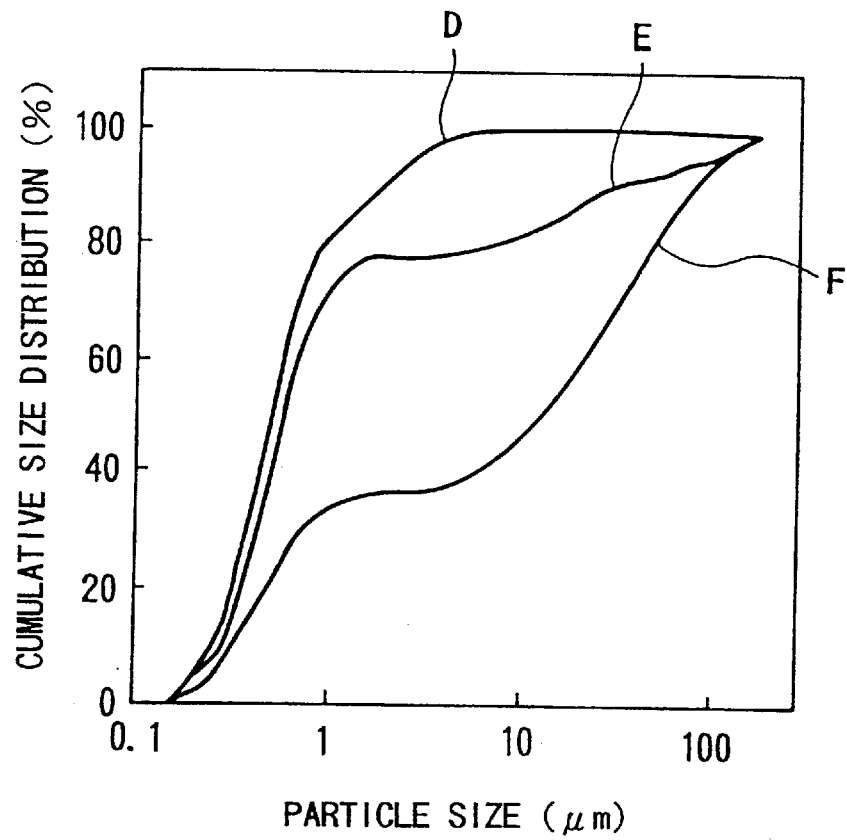
FIG. 4 is a graph showing the relationship between the particle size (μm) of dust and a cumulative size distribution (%)

Further, it was found in the above process that chlorine (curve D) was more omnipresent to fine powder than alkali (curve E) as shown in FIG. 4. Note, a curve F represents the cumulative size distribution of a particle size of dust, the axis abscissas represents a particle size ($\mu$m) and the axis of ordinates represents a cumulative size distribution of a particle size (%), respectively.

As a result, when attention was paid only to the removal of chlorine, it was found that when extracted gases after cooling were caused to pass through a separator, a sufficient reduction ratio of chlorine could be obtained by a particle size of about 5 to 7 $\mu$m different from the particle size 10 $\mu$m which was used in the alkali bypass system. An amount of waste dust could be reduced in a chlorine bypass system as compared with the alkali bypass system due to this knowledge. The amount of waste dust was made to 0.1% or less of the quantity of production by the kiln from the above-mentioned.

The waste dust is conventionally taken out to the outside of the system and reclaimed or washed with water to remove alkali therefrom and then used as a part of a cement raw material. This is because of the reason that since a lot of dust is discharged in the case of the alkali bypass system, when the dust is returned to the system as it is, it adversely affects the quality of cement.

Figure 5:
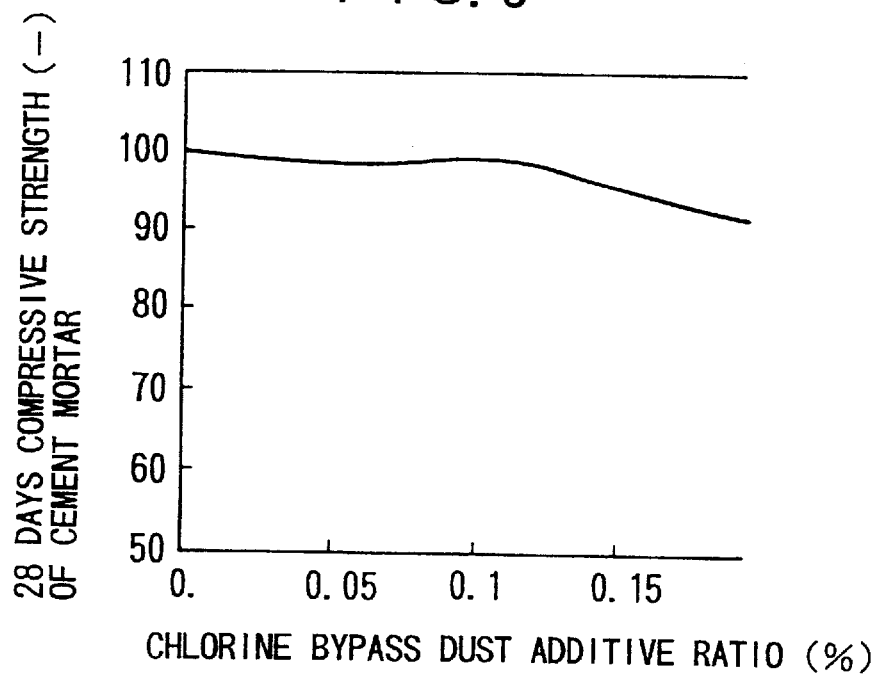
FIG. 5 is a graph showing the relationship between the dust additive ratio (5) in a chlorine bypass system and the 28 days compressive strength of cement mortar (-)

The inventors of the present invention studied what degree of chlorine bypass dust added to cement adversely affected the quality thereof by taking the above point into consideration and FIG. 5 shows the result of the study.

According to FIG. 5, it could be found that the addition of the chlorine bypass dust using the present invention to cement in an amount exceeding 0.1% greatly lowered the 28 days compressive strength of cement mortar which was an important index indicating the quality of cement. From this, it could be found that no problem was caused in quality by the addition of 0.1% or less of the chlorine bypass dust to cement. In FIG. 5, the axis of ordinates represents the 28 days compressive strength (–) of cement mortar and the axis of abscissas represents the additive ratio (%) of the chlorine bypass dust.

Since the quantity of production of clinker made by a cement kiln is usually in direct proportion to the quantity of production of cement and the quantity of the dust discharged by the chlorine bypass system according to the present invention is less than 0.1% of the quantity of production of the clinker, even if the entire amount of the dust is mixed with the cement, the quality of the cement is not degraded.

Since all the amount of dust cannot be added to cement in the conventional alkali bypass system because the system discharges a lot of dust, the method of adding all the amount of dust can be realized for the first time by the employment of the present invention.

EMBODIMENT 1

Figure 6:
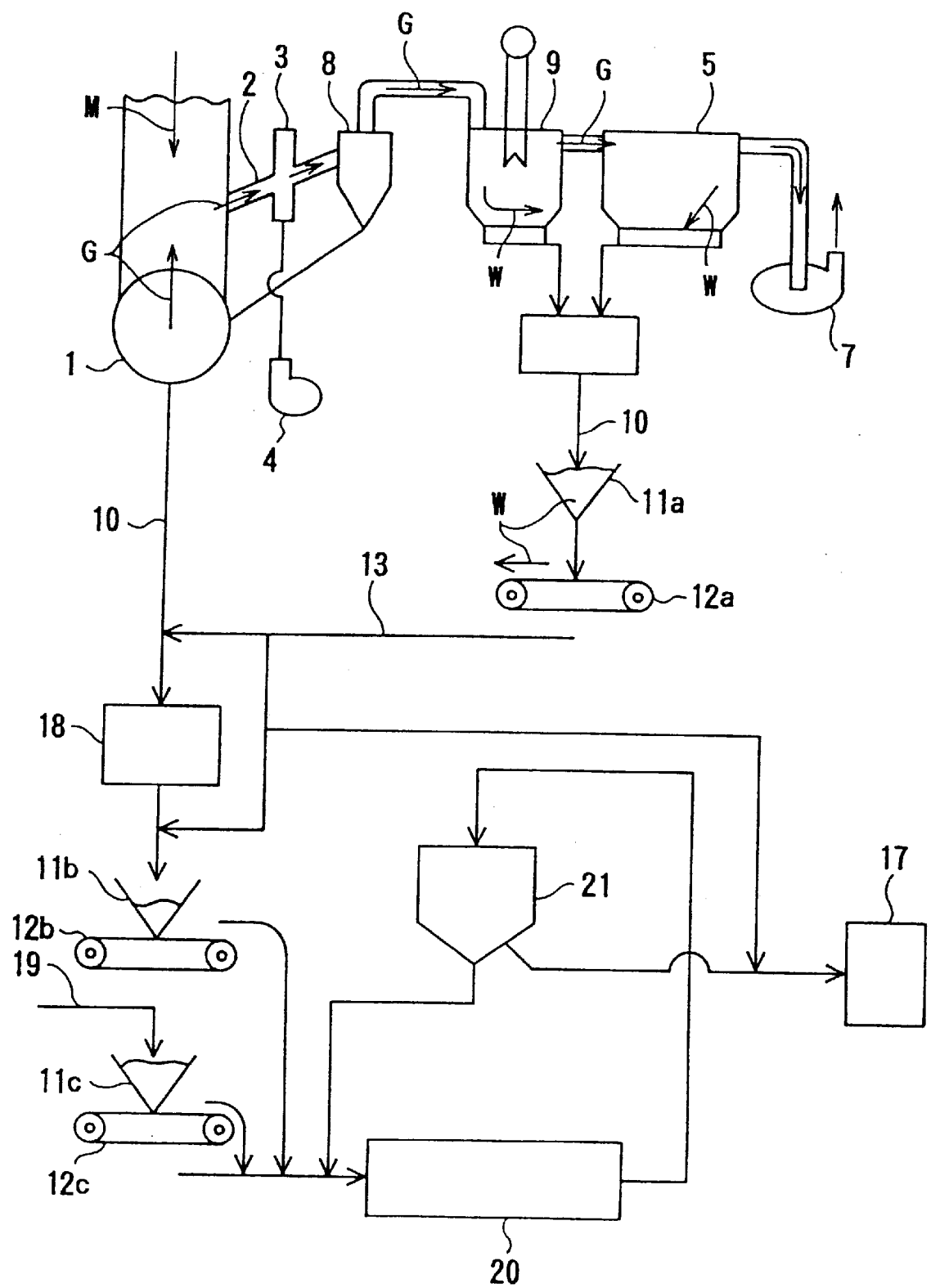
FIG. 6 is a view showing a first embodiment of the present invention.

A kiln exhaust gases processing apparatus by a chlorine bypass system of a first embodiment of the present invention will be described with reference to FIG. 6. When chlorine is bypassed, kiln exhaust gases G are extracted from the inlet of a rotary kiln (or also called kiln) 1 to a not shown preheater by an extraction duct 2. The position where the exhaust gases are extracted is preferably as far as possible from the position to which a raw material flows and, for example, a kiln rising duct 1a is selected as the position. This is because the extraction duct 2 is difficult to be damaged when the position of extraction duct is as far as possible from the raw material flowing position and because chlorine has a high concentration. The kiln exhaust gases are extracted at the ratio greater than 0% to equal to or less than 5%.

After the kiln exhaust gases G extracted from the extraction duct 2 are quickly cooled instantly to the melting point of a chlorine compound, that is, to 600 to 700° C., they are separated by a separator 8, for example, a cyclone type separator. When it is supposed that the quantity of production of clinker in a suspension preheater kiln or a new suspension heater kiln is represented by a kg, an apparatus excellent in economical efficiency and effectiveness can be obtained when the cross sectional area of the cyclone main body of the cyclone type separator is set to $a \times 7.55 \times 10^{-3}$ m$^2$ or less and preferably to the range of $a \times 5 \times 10^{-4}$ m$^2$ to $a \times 5 \times 10^{-3}$ m$^2$.

The separating point of the separator 8 is set to 5 to 7 $\mu$m and powder exceeding the separating point is returned to a kiln 1 as it is. After the gases G containing fine powder of 5 to 7 $\mu$m or less are subjected to heat exchange through a boiler 9, the dust contained therein is collected by a dust collector 6 and then the gases G are exhausted to the atmosphere. Dust W having a large content of chlorine which is collected by the boiler 9 and the dust collector 6 are discharged to the outside of a cement kiln system. The dust W containing chlorine in the high concentration is transported to a cement finishing mill system by suitable transportation means 10, for example, a truck, an air conveying vehicle, air transportation means, a belt conveyer, a chain conveyer or the like.

The above transported dust W is mixed with the clinker 14 in a clinker tank 18 which is calcined out from the kiln 1 through a primary storage bin 11a, feed equipment 12b and transportation means 13. Note, the dust W may be supplied to a storage bin 1ib in which the clinker is stored, supplied to a finishing mill 20 or supplied to and mixed with cement 17 discharged from the finishing mill 20.

EMBODIMENT 2

Figure 7:
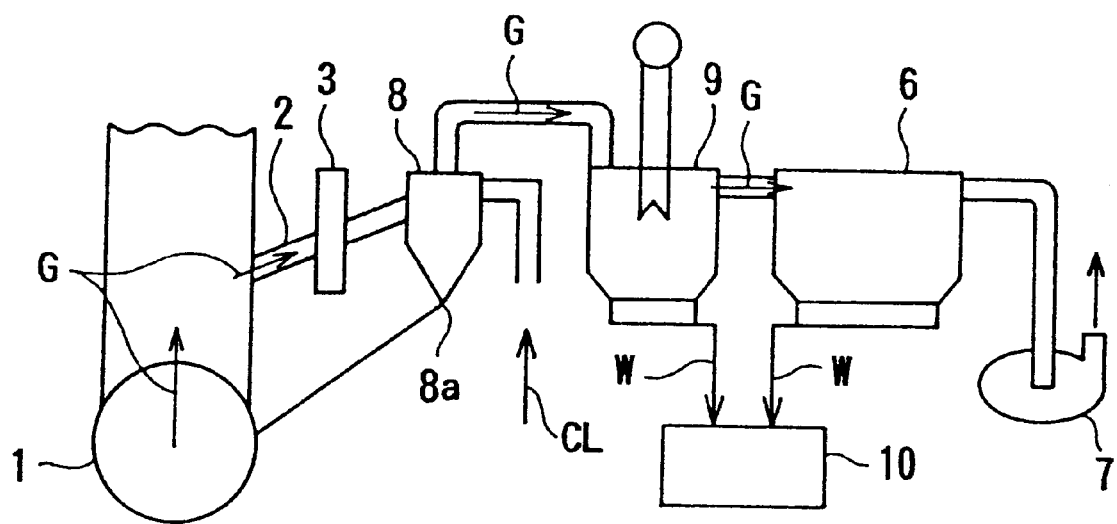
FIG. 7 is a view showing a second embodiment of the present invention.

An embodiment 2 of the present invention will be described with reference to FIG. 7. In the embodiment 2, kiln exhaust gases G of high temperature extracted from a kiln exhaust gases extraction duct 2 are directly introduced to a separator 8, for example, a cyclone, and separated while cooled to 600° C. to 700° C. which is the melting point of a chlorine compound.

A cooling method is such that cooling air CL is introduced from the inlet or the body 8a of the cyclone 8 to instantly cool the gases. A process to be executed thereafter is the same as that of the embodiment 1.

EMBODIMENT 3

Figure 8:
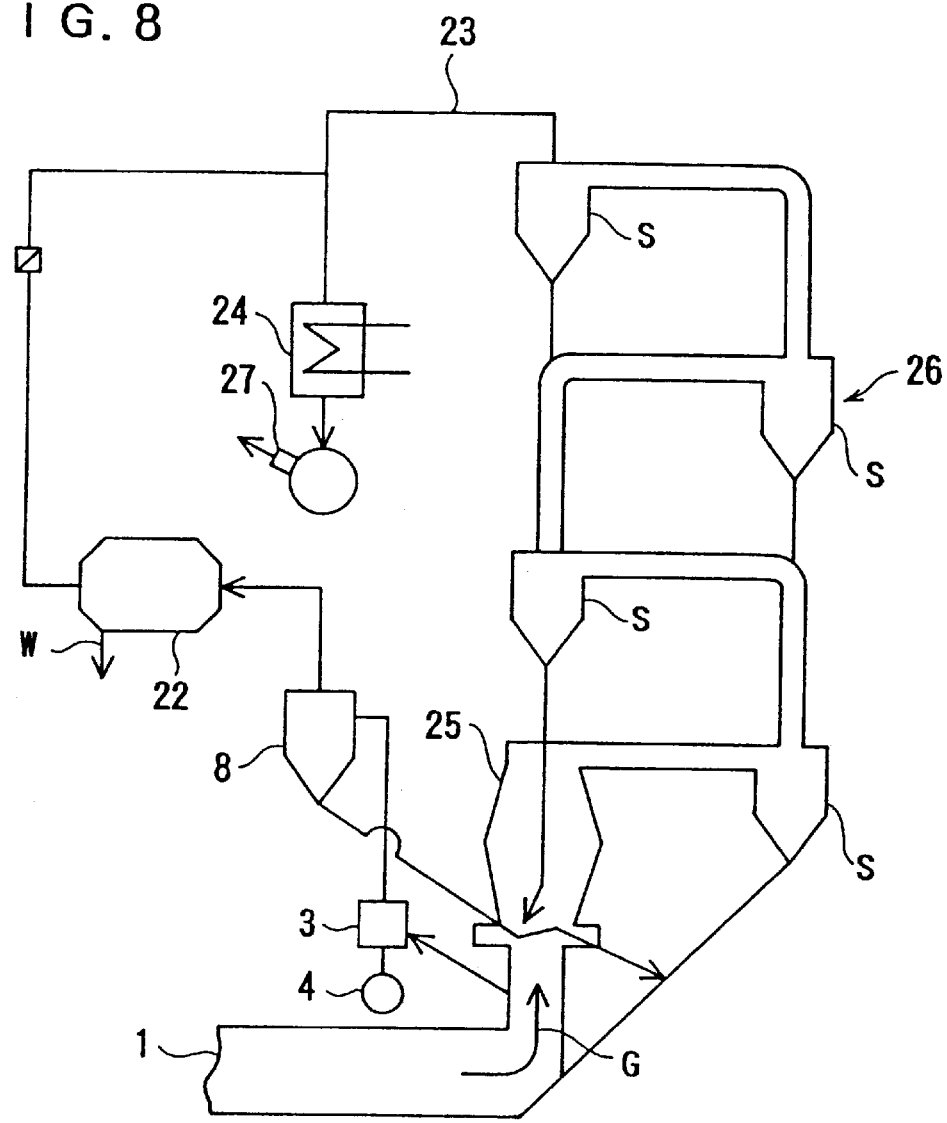
FIG. 8 is a view showing a third embodiment of the present invention.

An embodiment 3 of the present invention will be described with reference to FIG. 8. The embodiment 3 shows another method of the exhaust gases processing method in the embodiment 2. After fine powder dust containing chlorine of high concentration is collected from kiln exhaust gases G, which have passed through a separator 8, by a dust collector capable of processing the exhaust gases G even at high temperature, for example, a moving bed dust collector 22, the exhaust gases G are returned to the exhaust gases of a kiln preheater pipe 23 and the heat thereof is collected by a waste heat boiler 24 provided with the apparatus. Note, numeral 25 denotes a calciner, numeral 26 denotes a preheater, numeral 27 denotes an induced draft fan, and a symbol S denotes the cyclone of the preheater 26, respectively.

EMBODIMENT 4

Figure 9:
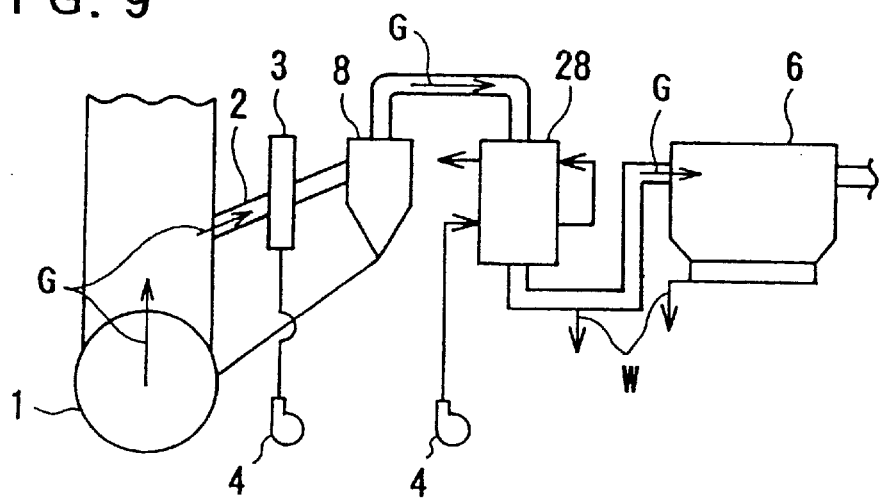
FIG. 9 is a view showing a fourth embodiment of the present invention.
Figure 10:
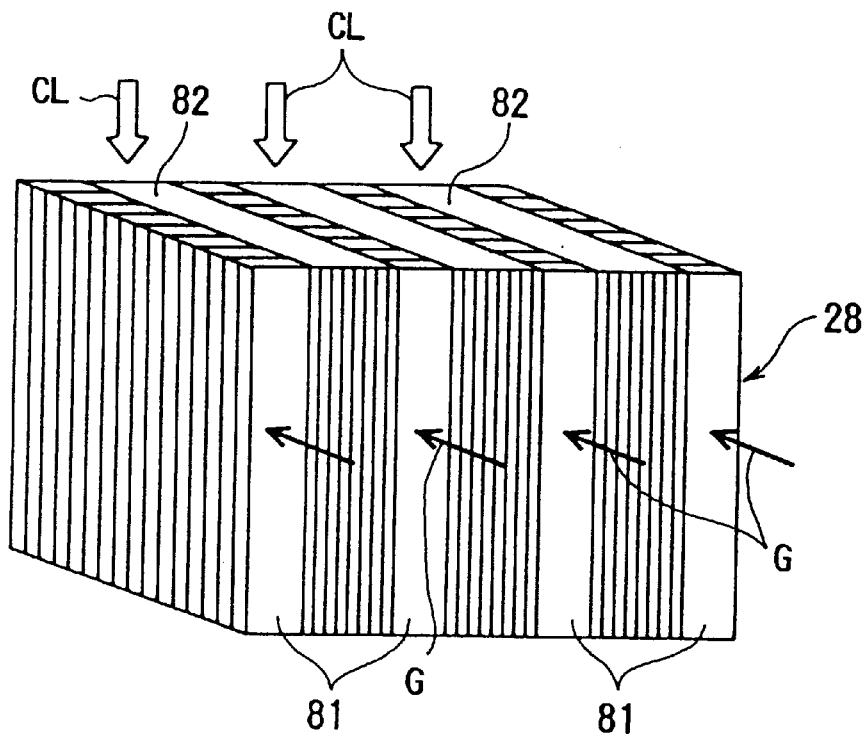
FIG. 10 is an enlarged perspective view of the indirect type air cooler of FIG. 9.

A fourth embodiment of the present invention will be described with reference to FIG. 9 and FIG. 10. The embodiment 4 shows still another exhaust gases processing method in the embodiment 2.

Although the fine powder in exhaust gases G must be separated after the rough particles therein are separated by a separator 8, since the gases have a high temperature of 400° C. to 500° C. at this stage, the dust contained in the gases cannot be separated by an ordinary dust collector without the use of, for example, a moving bed dust collector which permits the dust in the exhaust gases to be collected as it is and the exhaust gases to be returned to a kiln system so that the waste heat thereof can be collected by a waste heat boiler.

To cope with this problem, conventionally, the temperature of the gases is lowered and the heat thereof is collected by spraying water or installing a small boiler.

However, the method of lowering the temperature by spraying water cannot be used because it makes the use of dust to cement difficult. Thus, there is used a device using cool air, for example, an indirect type air cooler, a cooling air mixing type cooler or the like which indirectly executes cooling.

The indirect type air cooler will be described. As shown in FIG. 10, the air cooler 28 is made combining the passage 81 for dust containing gases G and the passage 82 for cooling air so as to lower the temperature of the dust containing gases G to 200° C. or less by the cooling air CL.

Although this type of indirect cooling is ordinarily executed by using water as a cooling medium, the use of water in the present invention causes condensation on a boundary surface or increases humidity, thus there arises a trouble of clogging a cooling machine by the adhesion of a chlorine compound which is deliquescent.

However, the use of cooling air as the cooling medium can lower the temperature of the dust containing gases without the occurrence of the above trouble.

EMBODIMENT 5

Figure 11:
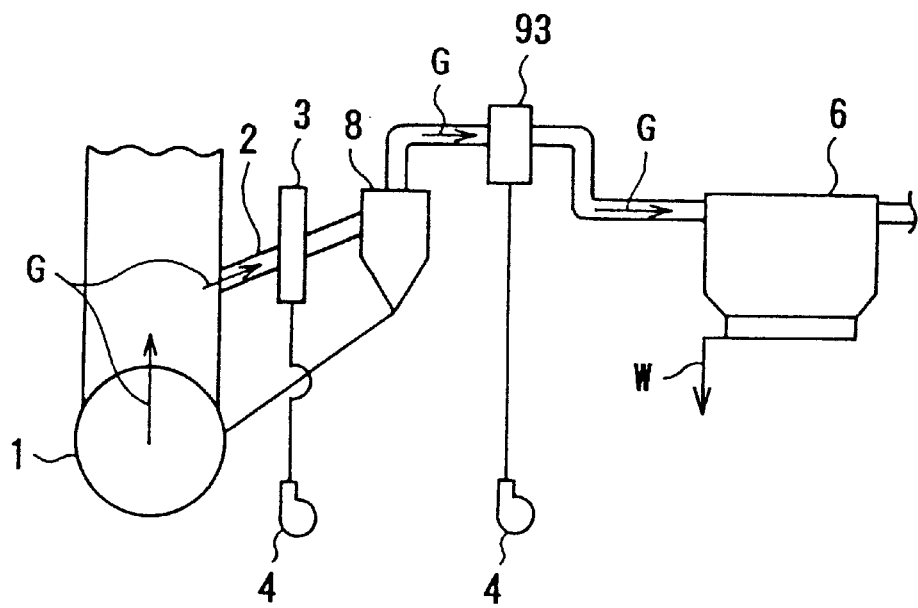
FIG. 11 is a view showing a fifth embodiment of the present invention.

An embodiment 5 of the present invention will be described with reference to FIG. 11. The embodiment 5 is different from the embodiment 1 in that an air mixing type cooler 93 similar to the above cooler 3 is interposed between a separator 8 and a dust collector 6.

The embodiments of the present invention are not limited to the above arrangements but, for example, the cooling air CL may be supplied to the cooler 3 in an amount larger than that in the other embodiments and the kiln exhaust gases G may be introduced to the separator 8 after the temperature thereof is lowered to 200° C. or less.

As apparent from the above description, the present invention achieves the following remarkable advantages:

(1) since the extraction ratio of the kiln exhaust gases is set to more than 0% to equal to or less than 5%, almost all the chlorine can be removed and as a result, a rotary kiln can be stably operated and chlorine can be effectively removed with a minimum amount of heat loss;

(2) since an amount of gases to be extracted in the chlorine bypass system is smaller than that extracted in the alkali bypass system, the size of the processing apparatus can be reduced, thus both the space and the cost of the apparatus can be reduced, whereby the kiln can be stably and economically operated; and (3) since the amount of the gases extracted by the kiln is smaller than that extracted by prior art and since the separating point of the separator is small, the amount of the exhaust dust can be greatly reduced.

As a result, since the amount of dust can be reduced to such a degree as causes practically no problem in the quality of cement even if the dust is mixed with cement by being caused to bypass the kiln in place of being exhausted to the outside of the cement system, a process for reclaiming the dust can be omitted.

Further, since the amount of the dust is very small as compared with that in the prior art, even if the dust is reclaimed or washed with water, a cost for processing it is very low, thus the present invention is advantageous from a view point of economic efficiency.

We claim:

1. A kiln exhaust gases processing method by a chlorine bypass system, comprising the steps of:

extracting a portion of kiln exhaust gases from a kiln between a kiln inlet and preheater, where volatile components are concentrated;

cooling the extracted exhaust gases to a temperature equal to or lower than the melting temperature of a chlorine compound;

separating the dust in the exhaust gases to rough powder and fine powder by a separator; and returning the separated rough powder to the kiln and supplying the fine powder to downstream of the separator, wherein the ratio of the extracted amount of the kiln exhaust gases is more than 0% to equal to or less than 5%.

2. A kiln exhaust gases processing method by a chlorine bypass system, comprising the steps of:

extracting a portion of kiln exhaust gases from a kiln between a kiln inlet and preheater, where volatile components are concentrated;

cooling the extracted exhaust gases to a temperature equal to or lower than the melting temperature of a chlorine compound;

separating the dust in the exhaust gases to rough powder and fine powder by a separator; and returning the separated rough powder to the kiln and supplying the fine powder to downstream of the separator, wherein the ratio of the extracted amount of the kiln exhaust gases is more than 0% to equal to or less than 5% and the particle size to be separated by the separator is 5 μm to 7 μm.

3. A kiln exhaust gases processing method by a chlorine bypass system, comprising the steps of:

extracting a portion of kiln exhaust gases from a kiln between a kiln inlet and preheater, where volatile components are concentrated;

cooling the extracted exhaust gases to a temperature equal to or lower than the melting temperature of a chlorine compound;

separating the dust in the exhaust gases to rough powder and fine powder by a separator; and returning the separated rough powder to the kiln and supplying the fine powder to downstream of the separator, wherein the ratio of the extracted amount of the kiln exhaust gases is more than 0% to equal to or less than 5%, the particle size to be separated by the separator is 5 μm to 7 μm and all the fine powder is mixed with clinker or cement.

4. A kiln exhaust gases processing apparatus by a chlorine bypass system, comprising:

extracting means, positioned between a kiln inlet and preheater, where volatile components are concentrated, for extracting a portion of exhaust gases from a kiln;

cooling means far cooling the extracted exhaust gases to 700° C. or less;

a separator for separating the dust in the cooled exhaust gases to rough powder and fine powder; and rough powder/fine powder transporting means for returning the separated rough powder to the kiln and supplying the separated fine powder to downstream of said separator, wherein said extracting means extracts the kiln exhaust gases at the ratio more than 0% to equal to or less than 5%, the separating point of said separator is 5 μm to 7 μm, and said rough powder/fine powder transporting means transports all the fine powder to a clinker tank or a finishing mill.

5. A kiln exhaust gases processing apparatus by a chlorine bypass system according to claim 4, wherein said separator is a cyclone separator.

6. A kiln exhaust gases processing apparatus by a chlorine bypass system according to claim 5, wherein said cyclone separator has cylindrical parts of cyclone whose cross sectional area is set to $a \times 7.55 \times 10^{-3}$ m$^2$ or less supposing that the kiln has a clinker calcining capacity of a kg/minute.

7. A kiln exhaust gases processing apparatus by a chlorine bypass system according to claim 4, wherein said separator communicates with a dust collector through an indirect type air cooler.

8. A kiln exhaust gases processing apparatus according to claim 4, wherein said separator communicates with a dust collector through a cooling air mixing type air cooler.

9. A kiln exhaust gases processing apparatus by a chlorine bypass system according to claim 4, wherein said separator is a moving bed dust collector.

* * * * *